(12) United States Patent
Chalmers

(10) Patent No.: US 12,491,407 B2
(45) Date of Patent: Dec. 9, 2025

(54) TIMELY COMPONENT MOVEMENT MEASURING SYSTEM

(71) Applicant: Fox Factory, Inc., Duluth, GA (US)

(72) Inventor: Douglas Alexander Chalmers, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 104 days.

(21) Appl. No.: 17/863,316

(22) Filed: Jul. 12, 2022

(65) Prior Publication Data

US 2023/0025376 A1    Jan. 26, 2023

Related U.S. Application Data

(60) Provisional application No. 63/221,661, filed on Jul. 14, 2021.

(51) Int. Cl.
*A63B 24/00*     (2006.01)
*A63B 69/16*     (2006.01)

(52) U.S. Cl.
CPC .......... *A63B 24/0006* (2013.01); *A63B 69/16* (2013.01); *A63B 2024/0009* (2013.01)

(58) Field of Classification Search
CPC ................ A63B 24/0006; A63B 69/16; A63B 2024/0009; A63B 22/0605; A63B 2220/833; B62J 45/40; G01D 5/145
See application file for complete search history.

(56) References Cited

U.S. PATENT DOCUMENTS

| | | | |
|---|---|---|---|
| 7,484,603 B2 | 2/2009 | Fox | |
| 8,838,335 B2 | 9/2014 | Bass et al. | |
| 8,955,653 B2 | 2/2015 | Marking | |
| 9,108,098 B2 | 8/2015 | Galasso et al. | |
| 9,303,712 B2 | 4/2016 | Cox | |
| 10,036,443 B2 | 7/2018 | Galasso et al. | |
| 10,060,499 B2 | 8/2018 | Ericksen et al. | |
| 10,443,671 B2 | 10/2019 | Marking | |
| 10,466,475 B2 * | 11/2019 | Chen | A63B 24/0087 |
| 10,561,925 B2 * | 2/2020 | Shi | G06F 3/0219 |
| 10,737,546 B2 | 8/2020 | Tong | |
| 10,885,319 B2 * | 1/2021 | Onuki | G06F 3/0304 |
| 11,452,909 B2 * | 9/2022 | Jung | A63F 13/245 |
| 11,452,928 B2 * | 9/2022 | Kim | G06F 3/1454 |
| 11,511,176 B2 * | 11/2022 | Zitvogel | A63F 13/525 |
| 11,718,360 B1 | 8/2023 | Mcallister | |
| 2011/0111923 A1 | 5/2011 | Bacanovic et al. | |

(Continued)

FOREIGN PATENT DOCUMENTS

| | | | | |
|---|---|---|---|---|
| CN | 109646879 A | | 4/2019 | |
| CN | 109646879 B | * | 4/2021 | ......... A63B 22/0605 |

(Continued)

OTHER PUBLICATIONS

European Search Report for European Application No. 22185028.2, 7 pages, Nov. 15, 2022.

(Continued)

*Primary Examiner* — Andrew M Kobylarz

(57) ABSTRACT

A timely component movement measuring system for a vehicle is disclosed. The system includes a component of a vehicle, the component having a range of motion. The system also includes a sensor to measure a movement of the component through some or all of the range of motion of the component.

17 Claims, 11 Drawing Sheets

(56) References Cited

U.S. PATENT DOCUMENTS

2012/0242331 A1    9/2012  Dengler et al.
2016/0236036 A1*   8/2016  Kalogiros .......... A63B 22/0023
2016/0300390 A1*  10/2016  Malafeew ............ A63F 13/525
2023/0025376 A1*   1/2023  Chalmers ............. A63B 69/16

FOREIGN PATENT DOCUMENTS

EP      4119901 A1     1/2023
WO   2009034309 A1     3/2009

OTHER PUBLICATIONS

European Examination Report for European Application No. 22185028.2, 5 pages, Sep. 19, 2024.

* cited by examiner

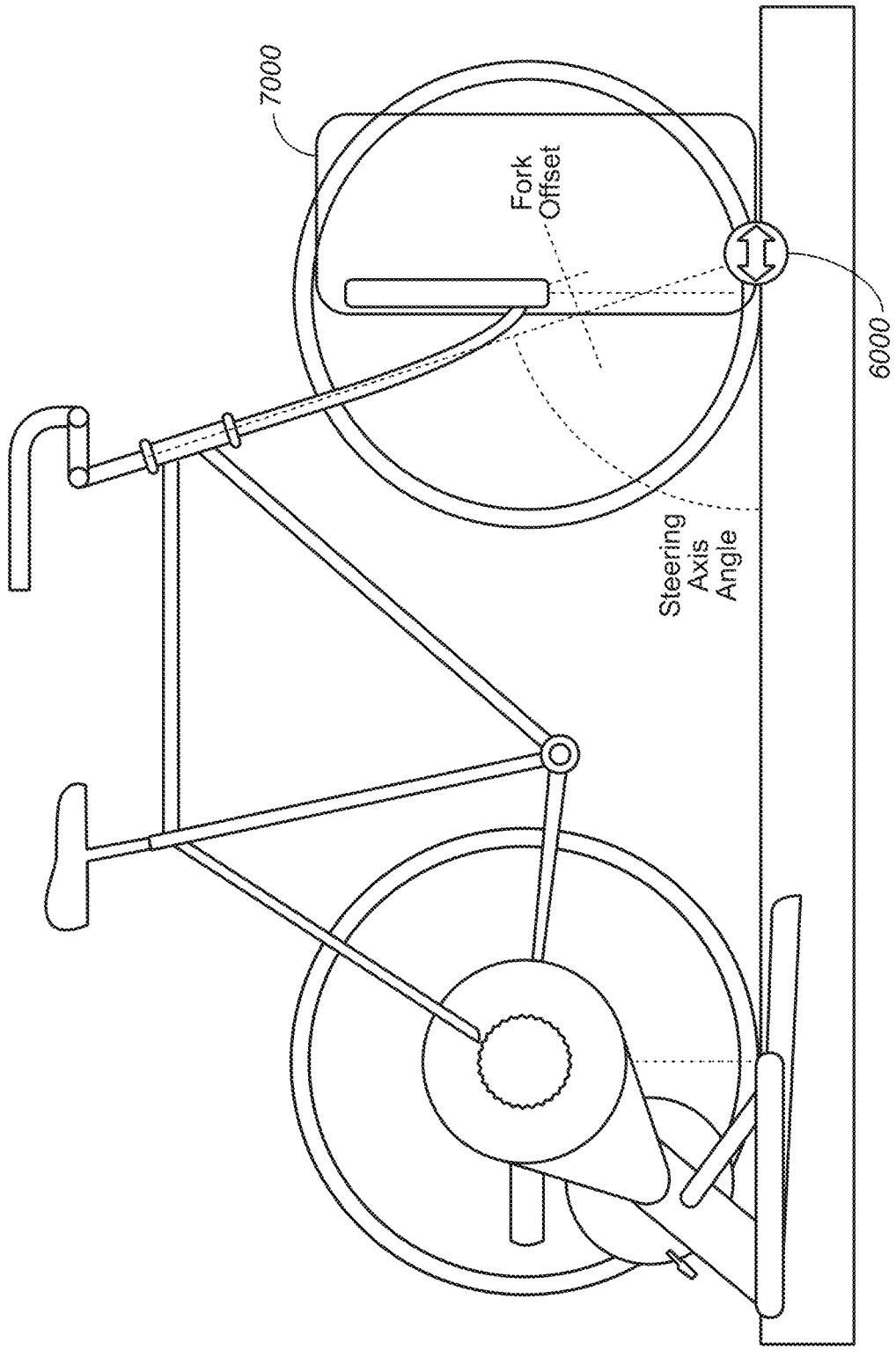

TIMELY COMPONENT MOVEMENT MEASURING SYSTEM

CROSS-REFERENCE TO RELATED APPLICATIONS (PROVISIONAL)

This application claims priority to and the benefit of U.S. Provisional Patent Application No. 63/221,661 filed on Jul. 14, 2021, entitled "REAL-TIME, ACCURATE, ADJUSTABLE COMPONENT MOVEMENT MEASURING SYSTEM" by Douglas Alexander Chalmers, and assigned to the assignee of the present application, the disclosure of which is hereby incorporated by reference in its entirety.

FIELD OF THE INVENTION

Embodiments of the present technology relate generally a sensor for measuring component movement.

BACKGROUND

Often, in a static training set-up, a bicycle is fixed in a given location such that it can be pedaled, steered, or the like without the bicycle actually moving from its stationary location. A simple example of a static training bicycle set-up is a stationary bicycle. A basic stationary bicycle usually includes a basic bicycle shape with a saddle (or seat), pedals and some type of resistance adjustment capability. While providing a good bicycle pedaling-type workout, a stationary bicycle may not include handlebars, is usually not as ergonomically adjustable/configurable as an actual bicycle, and is not able to provide actual locomotion. In contrast, a bicycle trainer allows a user to mount their own bicycle in a fixed/stationary position while it is being pedaled. A bicycle trainer is typically made up of a frame, a clamp with which the bicycle is held securely, a roller that is pressed up against the back wheel, and a mechanism used to provide resistance. The user's bicycle is mounted onto the trainer so they can experience a workout comparable to a normal ride.

BRIEF DESCRIPTION OF THE DRAWINGS

Aspects of the present invention are illustrated by way of example, and not by way of limitation, in the accompanying drawings, wherein:

FIGS. 6A and 6B are perspective views of various bicycle trainers, in accordance with embodiments of the present invention.

Figure 1:
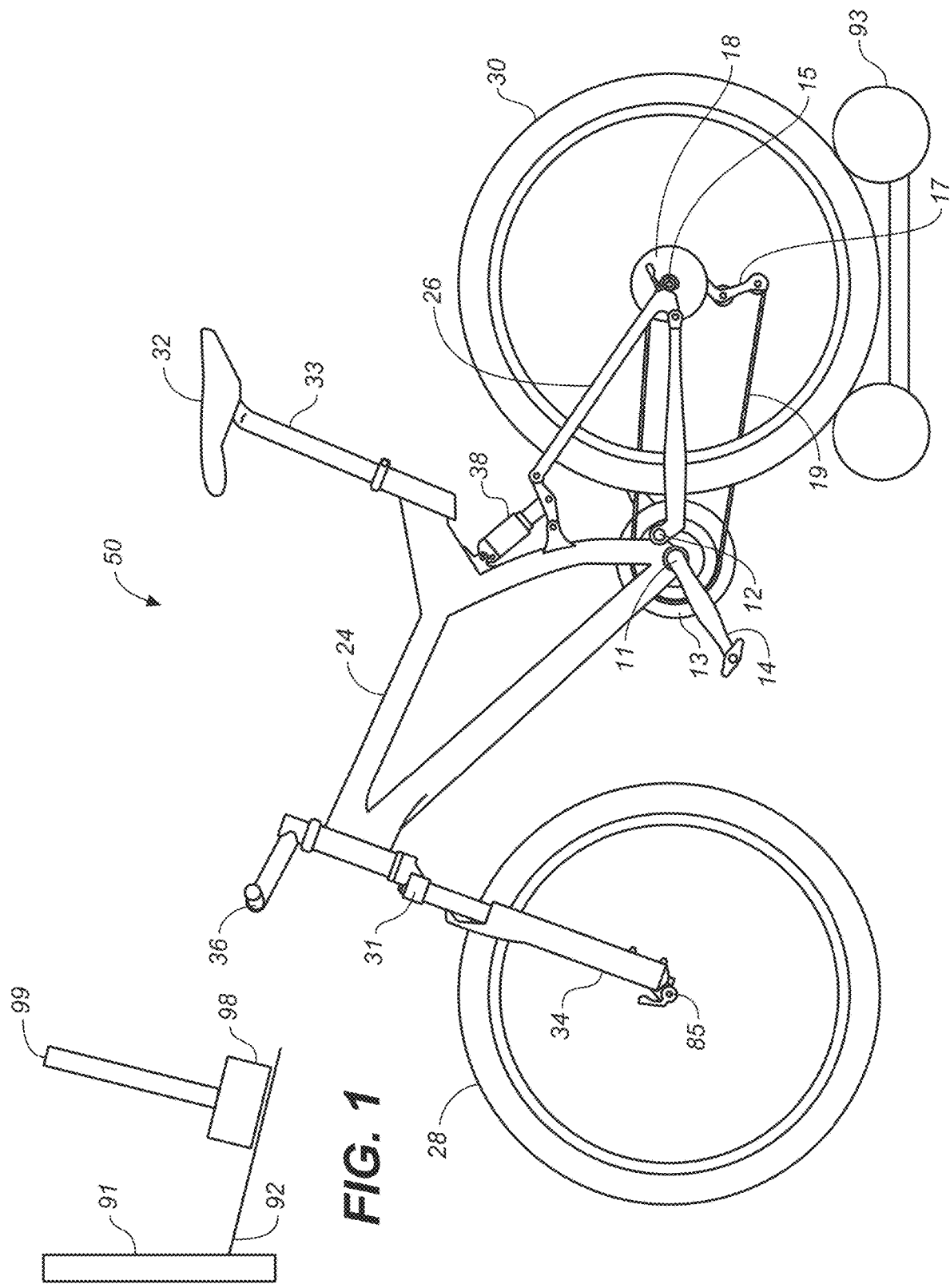
FIG. 1 is a perspective view of a bicycle mounted on a bicycle trainer, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Embodiments described herein provide a timely component angle measuring system. In one embodiment, the timely component angle measuring system is accurate. In one embodiment, the timely component angle measuring system is adjustable. In one embodiment, the timely component angle measuring system is accurate and adjustable. In one embodiment, the system is used to detect the movement of a component of a bicycle. In one embodiment, the bicycle is mounted with respect to a training set-up (indoor, outdoor, etc.), where the bicycle remains static during the workout or activity. In one embodiment, the location/orientation/movement, or the like of the component being monitored is used to control some aspect of the workout or activity in which the user is taking part.

In the following discussion the term "timely" is meant to convey an amount of time between instant and when a normal user would perceive latency (e.g., real-time, near real-time, within a normal user's ability to perceive time, etc.). For example, a person will often use a switch to turn on a light in a room. While there is an amount of time that occurs between the movement of the switch, the activation of the light source, and the projection of light waves from the light source, for purposes of the following discussion, the activation of the light would be considered "timely" as a normal person is not able to perceive the delay between switch activation and the appearance of light.

Similarly, in computer operations, operations that include a sensor recognizing an event, the sensor transferring data about the event to a processor, the processor receiving the data, utilizing the data to determine an appropriate output, and providing the output in an interactive environment is considered "timely" (for purposes of the following discussion) if it is performed within a time period such that the normal user would not perceive a delay between the event (e.g., a user input) and the occurrence of the resultant action within the interactive environment.

In the following discussion, and for purposes of clarity, a bicycle is utilized as the example vehicle. However, in another embodiment, the timely component movement measuring system could be used on any one of a variety of vehicles such as, but not limited to, a bicycle, an electric bike (e-bike), a motorcycle, a watercraft, a snow machine, a 3-4 wheeled vehicle, a multi-wheeled vehicle, or the like.

Referring now to FIG. 1, a perspective view of a bicycle 50 having a timely component movement measuring system integrated therewith is shown in accordance with an embodiment. In one embodiment, bicycle 50 has a frame 24 with a suspension system comprising a swing arm 26 that, in use, is able to move relative to the rest of frame 24; this movement is permitted by, inter alia, rear shock assembly 38. The front fork assembly 34 also provide a suspension function via a shock assembly in at least one fork leg.

In one embodiment, bicycle 50 is a full suspension bicycle. In another embodiment, bicycle 50 has only a front suspension and no rear suspension (e.g., a hard tail). In different embodiments, bicycle 50 could be a road bike, a mountain bike, a gravel bike, an electric bike (e-bike), a hybrid bike, a motorcycle, or the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 34 via axle 85. In one embodiment, front fork assembly 34 includes a crown 31. In one embodiment, a portion of front fork assembly 34 (e.g., a steerer tube) passes through the frame 24 and couples with handlebars 36. In so doing, the front fork assembly and handlebars are rotationally coupled with the frame 24 thereby allowing the user to steer the bicycle 50.

In one embodiment, bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the user of the bicycle 50.

In one embodiment, bicycle 50 is driven by a chain 19 that is coupled with both front sprocket assembly 13 and rear sprocket 18. As the user pedals, the rotational input to pedal arms 14 cause the front sprocket assembly 13 to rotate about bottom bracket axis 11. This rotation applies a force to chain 19 which transfers the user generated rotational energy to rear sprocket 18 which results in the rotation of rear wheel 30. Chain tension device 17 provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to frame 24) and the rear axle 15 changes due to suspension articulation.

In one embodiment, saddle 32 is connected to the frame 24 via seatpost 33. In one embodiment, seatpost 33 is a dropper seatpost.

FIG. 1 includes a bicycle trainer 93. In one embodiment, bicycle trainer 93 is a device that interacts with (or replaces) the rear wheel of bicycle 50 such that the rear wheel resistance can be adjusted and the bicycle 50 remains somewhat stationary. In one embodiment, the bicycle trainer 93 can use wing, magnets, fluid, rollers, flywheels, and the like to provide the resistance to the rear wheel.

In one embodiment, bicycle 50 is coupled with bicycle trainer 93 such that bicycle 50 is somewhat (or completely) supported by bicycle trainer 93 such that when using the bicycle trainer 93 the user is receiving an amount of support to keep the bicycle 50 balanced. In one embodiment, the rear wheel of bicycle 50 sits atop the bicycle trainer 93 and no support is provided to keep the bicycle 50 balanced. In one embodiment, bicycle trainer 93 would include a plurality of components such as a resistance adjustable component and a bicycle 50 supporting component.

In one embodiment, bicycle trainer 93 includes a frame and a plurality of rollers that are pressed up against the back wheel, and a mechanism used to provide resistance. The user's bicycle is mounted onto the trainer so they can experience a workout comparable to a normal ride. In one embodiment, bicycle trainer 93 includes a clamp or frame system to securely hold bicycle 50. In one embodiment, bicycle trainer 93 includes a rear axle and is used in place of the rear wheel of the bicycle 50. In one embodiment, bicycle trainer 93 will include other aspects such as an environmental control (e.g., fan, heater, etc.), front tire block, training tire, or the like.

In one embodiment, bicycle trainer 93 will include a wired or wireless communications capability to provide input to (and in some embodiments receive input from) a virtual training system.

In one embodiment, a virtual training system includes a computing system 98 capable of communicating with bicycle trainer 93 and running interactive software for the virtual environment. In one embodiment, the virtual training system also includes a display such as display 99 for presenting the virtual environment to the user. In one embodiment, the virtual training system will utilize virtual goggles to present the virtual environment to the user.

In one embodiment, one or more of the environmental control aspects of bicycle trainer 93 are controlled by the virtual training system to provide appropriate temperature, headwind, tailwind, crosswind, and the like, to the training environment.

In one embodiment, the computing system 98 and/or display 99 is in a fixed position such as on a mount 92 affixed to a structure 91 (such as a wall, frame, etc.). In one embodiment, display 99 is coupled with a mount 92 that is coupled with handlebars 36. In one embodiment, display 99 and/or computing system 98 is a single devices such as a mobile device, tablet, pad, laptop, virtual goggles, or the like. In one embodiment, display 99 and computing system 98 include a plurality of components such as, but not limited to, a graphic user interface (GUI) display, mobile device, tablet, pad, laptop, virtual goggles, desktop, virtual machine, remote server, or the like. In one embodiment, display 99 and/or computing system 98 are provided in a location selected by a user, e.g., a table, stand, mount 92, worn by user, etc.

In one embodiment, the computing system 98 is coupled with the bicycle trainer 93 and the display 99 is communicatively coupled therewith. In one embodiment, display 99 is coupled with the bicycle trainer 93 and the computing system 98 is communicatively coupled therewith. In one embodiment, each of computing system 98, bicycle trainer 93, and the display 99 are coupled as a single component in a bicycle trainer setup. In one embodiment, each of computing system 98, bicycle trainer 93, and the display 99 are distinctly different components used in conjunction to provide the bicycle trainer described herein. Additional embodiments for a virtual environment and virtual environment operations are described in U.S. Pat. No. 9,108,098 which is herein incorporated, in its entirety, by reference.

In one embodiment, a virtual environment input is enhanced since the timely movement and the accuracy of measurement of the timely movement of the component are provided as timely input into the virtual environment to be used in real-time. For example, in one embodiment, the manipulation and/or movement of the handlebars is used to navigate a virtual/simulated environment. For example, the turning of the handlebars would generate an output that identified/indicated the direction of travel for the user on the training bicycle as translated to (depicted in) the virtual environment. In one embodiment, the manipulation and/or movement of the handlebars is used to define a degree of the turn input provided to the virtual simulated environment, e.g., a slight turning, turning, extreme turning, and any variations therebetween. In one embodiment, a turning of the handlebars to the maximum could translate into a spinning, flipping, or other trick performed on the bicycle within the virtual environment.

In general, the need for precision is important to provide real-world, timely, input into the interactive software (e.g., a virtual environment, game environment, etc.), to provide a most-realistic and accurate display of the interaction to the user via the display screen. For example, by having precise steering inputs (e.g., obtained from the actual handlebars 36 movements) provided to the interactive software in a timely fashion, the user will be immersed in the display and be able to perform the "ride" with the same level of accuracy as if it were actually occurring in the real world. This level of accurate training environment would provide a realistic and immersive experience for the user at a previously unavailable level of training.

In other words, since the user inputs would be timely and accurate (using the accurate measurement input recognizing capabilities described herein), the user would be able to use the virtual environment ride to obtain an accurate real world simulation. That is, the user would obtain visual and physical (e.g., muscle memory) training based on the actual layout of a given track/ride/trail. For example, if the user were going to compete in a real time event such as the Chalmers' invitational (a well-known and fully mapped out competition), prior to the event, the user could obtain the Chalmers' invitational virtual version and practice the event. Not only would the user be able to familiarize themself with the course visually, but with the addition of the accurate, timely steering (and/or other component performance) input capturing capabilities described herein, the user would be able to begin to form muscle memory of one or more different aspects as they virtually ride the course.

In one embodiment, the accurate steering input capability (along with other inputs such as pedaling, downhill, terrain type (e.g., road, gravel, dirt, mountain, creek, etc.)) would introduce previously unavailable levels of muscle memory type feedback to the user. This additional accuracy could be used in conjunction with the environment to provide virtual results such as oversteering and crashing, understeering and crashing, going too fast and crashing, etc. Moreover, the user could adjust the virtual environment for rain, temperature, and/or other environmental changes to modify the levels of friction, visibility, vehicle performance, etc.

Thus, for example, in a dry ride on the Chalmers' invitational virtual environment, around turn 7 the user's actual timely accurate steering input and speed would provide the user with a turning capability of X before the front tire exceeded the available friction and a crash occurred. As such, the user would be able to reach the limits and practice riding the bicycle at very nearly actual limits in the virtual environment.

Moreover, in one embodiment, during the virtual practice, the user could introduce rain or standing water, dirt, etc., to turn 7. In so doing, the user's actual timely accurate steering input and speed would provide the user with an adjusted turning capability of Y before the front tire exceeded the now lower level of available friction and a crash occurred. As such, the user would be able to practice riding the bicycle at very nearly actual limits, across a number of different scenarios (e.g., dry, wet, raining, mud, etc.), in the virtual environment. Such training would provide a training regimen that would allow the user to reach, exceed, and therefore better define the envelop of the capabilities of the vehicle as if the user was training in the actual environment.

In one embodiment, by providing this accurate and timely level of steering in the virtual environment, when it comes time for the user to go to the Chalmers' invitational in the real world, the user would have a heightened and accurate existing feel (e.g., confidence, muscle memory, etc.) for the actual physical steering inputs that will be used for the ride.

Although the Chalmers' invitational is described herein. The accurate and timely steering input described herein is well suited for virtual environments that the user will never actually ride in the real world, for more interactive and immersive training rides, for other types of rides such as trail rides (that are virtual and performed by the user on a street bicycle or vise-versa), for virtual competitions, and the like.

Figure 2:
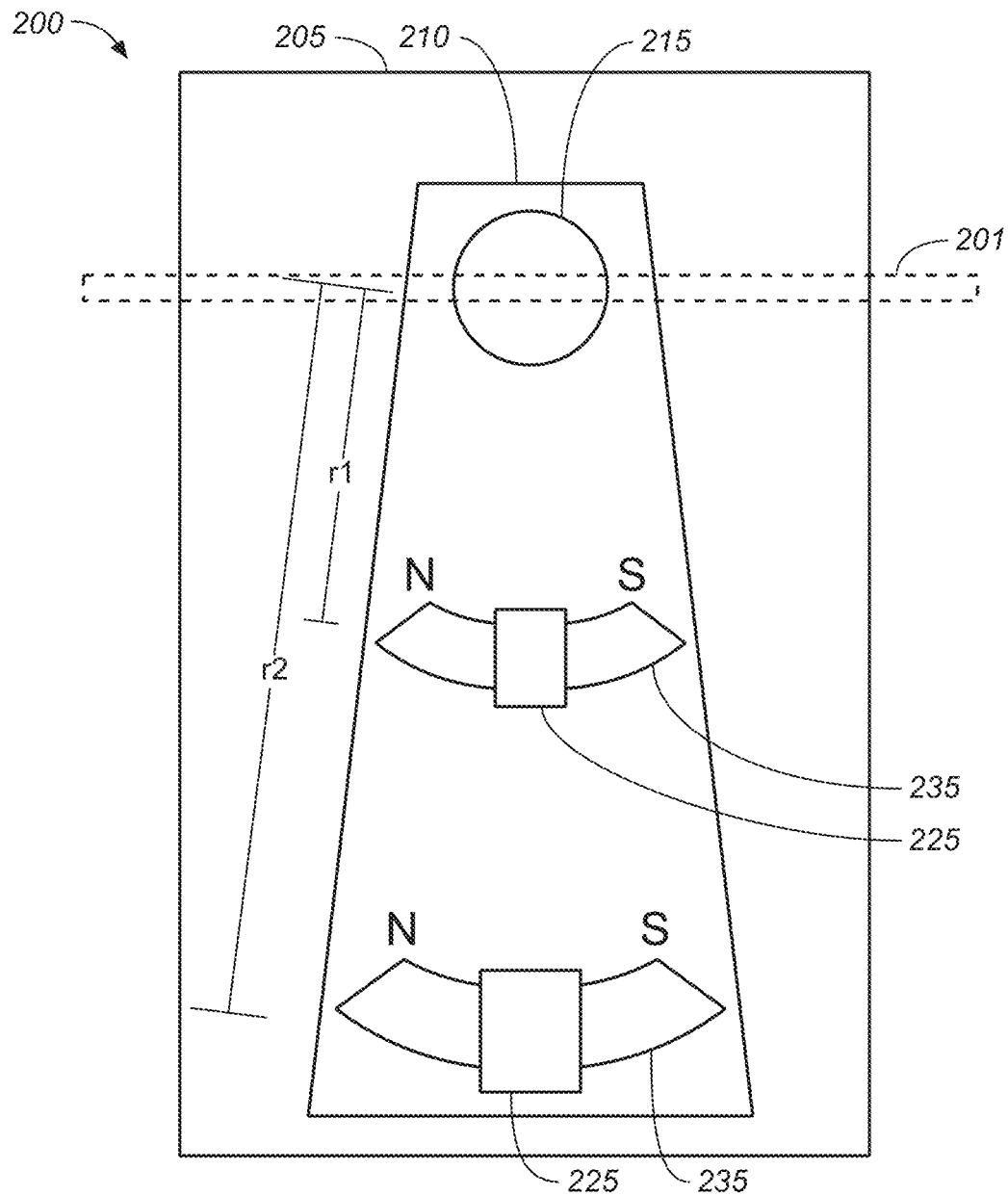
FIG. 2 is a top view of a timely component movement measuring system, in accordance with an embodiment.

Referring now to FIG. 2, a timely component movement measuring system 200 is shown in accordance with an embodiment. In one embodiment, timely component movement measuring system 200 includes a base plate 205, a pivot axis 215, a block 210, a sensor 225, and a magnet(s) 235. In one embodiment, timely component movement measuring system 200 is configured to measure the timely movement and/or angular position of component 201. In one embodiment, component 201 is handlebars 36. In one embodiment, component 201 is a brake lever, pedal arm 214, gear shift, or the like.

In one embodiment the magnet(s) 235 are mounted on the block 210. In one embodiment, when measuring steering input, block 210 may attach to a front wheel, a tire, a fork, a stem, a handlebar, a steering tube, or any other component of the bicycle that moves as part of the steering assembly. In one embodiment, when measuring input to other components such as brake input, pedal arm input, etc., block 210 is attached to a portion of the component, or a portion of the bicycle that moves as part of the movement of the component.

In one embodiment, the block 210 is aligned with the angle of the steering tube such that the angle of the block 210 is in alignment with the angle of the handlebars. In one embodiment, by making sure the angles are the same, the movement of the handlebars will be correctly defined by the movement of the block 210. In one embodiment, block 210 is mechanically coupled with the handlebars such as at the steering tube.

In one embodiment, the base plate 205 is linked to a fixed reference and the sensor 225 is mounted thereto. For example, in one embodiment, base plate 205 can be mounted to any relatively fixed point such as the floor, or another part of the bicycle that does not move with respect to the steering assembly when the steering assembly is moved. For example, in one embodiment, the fixed reference is the floor. In one embodiment, the fixed reference is the frame of the bicycle and the base plate 205 (and/or sensor 225) is mounted on the frame. In one embodiment, when measuring input to other components such as brake input, pedal arm input, etc., the base plate 205 (and/or sensor 225) is mounted to any relatively fixed point such as the floor, or another part of the bicycle that does not move with respect to the component whose movement is being measured.

In one embodiment, the sensor 225 is a Hall Effect sensor will detect the angular position of the front wheel/handlebar assembly (or other component) using an output voltage that is based on the magnetic field to which it is subjected. In one embodiment, when using a Hall Effect sensor, the magnet(s) 235 should be positioned and sized appropriately so that magnetic field fully inverts form north to south through the range of allowable motion on the fixture. In one embodiment, this maximizes the change in voltage and gives a higher resolution on the front wheel/handlebar position, thus reducing latency while enhancing sensor accuracy and adjustability.

In one embodiment, when using a Hall Effect sensor, the magnet(s) 235 should be positioned and sized appropriately so that magnetic field fully inverts form north to south through a desired range of motion on the fixture. In other words, using a fully inverted magnetic field through some or all of a range of motion.

In one embodiment, the fixed reference is the frame of the bicycle and the base plate 205 (and/or sensor 225) is coupled with a portion of the frame and the magnet(s) 235 are coupled with the crown of the fork assembly.

In one embodiment, a low friction connection is made between the base plate 205 and the block 210 to allow free movement of the steering assembly (or other component whose angular movement is being measured).

In one embodiment, the curved permanent magnet(s) 235 would be laid out across the range of motion designated for the sensor. In one embodiment, the range of motion of the sensor (e.g., the measurable angle of handlebar movement) could be adjusted by adjusting the length of the curved permanent magnet. For example, a longer curved magnet(s) 235 would be able to cover a larger turning radius (e.g., range of motion) of the handlebars 36.

In one embodiment, the range of motion (and/or accuracy) of the sensor could be adjusted based on its distance from the steering pivot (or rotation axis). In other words, the radial distance e.g., r1, r2, etc. of the magnet(s) 235 from the pivot axis 215 would change the angular sweep for the sensor.

For example, in one embodiment, when sensor 225 and magnet(s) 235 are located at the closer (or first) radial distance r1, the angular range of measurable motion would be a first angular range and the level of accuracy would be a first accuracy.

In contrast, when sensor 225 and magnet(s) 235 are located at the further (or second) radial distance r2, the angular range of measurable motion would be a second angular range which would be smaller than the first angular range covered by radial distance r1. However, the level of accuracy would be a second accuracy greater than the first accuracy covered by radial distance r1. That is, when sensor 225 and magnet(s) 235 are located at the further radial distance r2, a smaller total movement radius is covered (as compared to r1), but much more precision for more accurate angular change measurements would be obtained.

In one embodiment, there may be a plurality of sensor 225 and magnet(s) 235 located at a plurality of radial distances used in combination to provide both an expanded angular range of measurable motion while also being able to accurate angular change measurements for smaller movements.

For example, in one embodiment, as the bicycle steering assembly is turned by the user, the rotating element of block 210 will also rotate with respect to the base plate 205. This results in the magnetic field of the magnet(s) 235 moving relative to the sensor 225 (e.g., in one embodiment a hall-effect sensor), and thus the voltage output of the sensor 225 changes. This voltage change is used to determine the angle of the steering/handlebars as an input into the interactive software being used to render the virtual environment.

In one embodiment, the Hall effect sensor detects a magnetic field, and achieves a very high resolution for the range of motion of the handlebars. For example, in a real-world ride, as the speed is increased, the handlebar input/movement is minimal. In other words, a turn at a normal riding speed may be indicated by the movement of only a few degrees of the handlebars. As such, it is important that the sensor be able to accurately detect the minute movements of the handlebars to obtain realistic performance in the virtual environment.

For example, a turn of 1.25 degrees of the handlebars on a road bicycle would provide a significantly different turn radius than a turn of 1.5 degrees of the handlebars, much less a turn of 3 degrees of the handlebars. Thus, the sensor will need the capability of detecting slight variations of tenths of degrees of the handlebar motion in order to provide accurate steering inputs into the virtual environment.

In one embodiment, the hall effect sensor can be adjusted to cover a defined range of rotational motion. For example, in one embodiment, the Hall effect sensor could be adjusted to cover the rotation of the handlebars from 90 degrees in either direction (or any other angle as desired by the manufacturer, user, or virtual system). This could be a low-speed type of setup, e.g., at low speeds the handlebars can be turned quite a lot to make slow sharp turns.

In one embodiment, the Hall effect sensor could be adjusted to cover the rotation of the handlebars from 20 degrees in either direction. This could be a regular speed type of setup, e.g., at regular speeds the handlebars are turned much less, even when making sharp turns.

In one embodiment, the set-up could include a plurality of sensors (e.g., a low speed sensor set-up and a regular speed sensor set-up) that allow the virtual environment to receive low speed sensor input (e.g., higher turn angle degrees with less accuracy, e.g., 514 chip output from a 90 degree range or 0.17 degree level of accuracy) that would be applicable to low speed scenarios, and then a different regular speed sensor input (e.g., smaller turn angle degrees with increased accuracy, e.g., 514 chip output from a 20 degree range of motion or 0.04 degree level of accuracy) that would be applicable to regular (or high) speed scenarios.

Although 514 chip output is disclosed, it should be appreciated that the number of possible outputs could be more or fewer to define the level of accuracy of the degree measurement. For example, if a sensor has a 1028 chip output on a 4-bit chip. Using a 90-degree range on 1028 resolution would provide a level of accuracy of approximately 0.1 degrees. Using the same example, if the range was changed to 45-degree range of motion the 1028 resolution would provide a level of accuracy of approximately 0.05 degrees. In one embodiment, there may be two or more different sensors with the same or different levels of accuracy having different ranges of motion to provide different levels of angle-measurement accuracy.

In one embodiment, there may be a single sensor (or a plurality of sensors) were the single sensor (or the number of different sensors) sensitivity is adjusted based on speed in the virtual environment. For example, there could be both a lower level of sensitivity for larger ranges of motion (e.g., inputs at lower speeds) and higher levels of sensitivity for smaller ranges of motion (e.g., inputs at regular or higher speeds). For example, in a low-speed environment, the sensor might round readings to 0.5-degree steps to provide the input indicative of the larger motion of the handlebars.

In contrast, in a normal speed environment, the sensor would use degree readings at one-, two-, three-digit level of accuracy (or whatever desired accuracy by the virtual software, the user, the sensor capabilities, etc.) to provide accurate input indicative of the smaller input motions of the handlebars.

Figure 3:
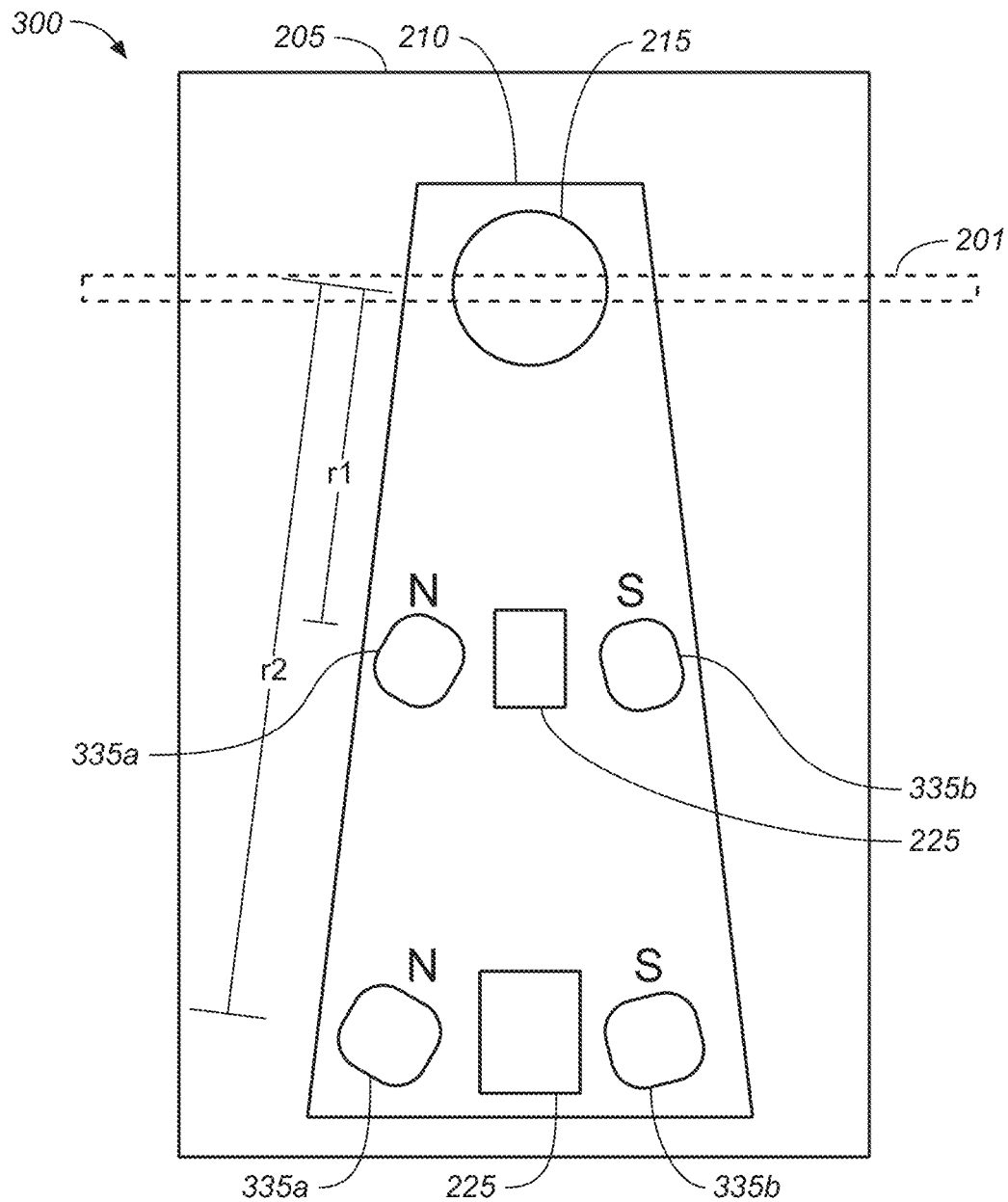
FIG. 3 is a top view of another timely component movement measuring system, in accordance with an embodiment.

Referring now to FIG. 3, a timely component movement measuring system 300 is shown in accordance with an embodiment. In one embodiment, timely component movement measuring system 300 includes a base plate 205, a pivot axis 215, a block 210, a sensor 225, and a plurality of magnet(s) 335a and 335b. In one embodiment, sensor 225 and the plurality of magnet (s) 335a and 335b would be located at a first radius r1. In one embodiment, sensor 225 and the plurality of magnet (s) 335a and 335b would be located at a second radial distance r2. In one embodiment, there could be two or more sets of magnet(s) 335a and 335b at different radius (e.g., r1 and r2 similar to that described in the discussion of FIG. 2) from the steering pivot to provide a low-speed sensor input for slow riding situations (e.g., large turn radius lower degree of angular precision) and a regular speed sensor input for normal riding situations (e.g., smaller turn radius higher degree of angular precision).

In one embodiment, the two magnet(s) 335a and 335b are laid out along a portion of the range of motion designated for the sensor 225. In one embodiment, the range of motion of the sensor 225 (e.g., the measured angle of handlebar movement) could be adjusted by adjusting the separation/spacing of two or more magnet(s) 335a and 335b.

In one embodiment, the location of the two magnet(s) 335a and 335b could be mechanically linked with the hard stops of the steering fixture (e.g., block 210). In so doing, the steering range can be adjusted/changed both mechanically and electronically.

Other Range of Motions to be Measured

In one embodiment, the sensor described herein is used to measure the motion, position and/or positional change, stresses and/or strains applied, and the like for one or more components such as, but not limited to, a brake lever, a gear shift lever, pedal position, seatpost position, saddle position, saddle, pedal, and the like, to provide timely, accurate movement/change identification.

In one embodiment, as the bicycle brake assembly is pulled or released by the user, the rotating element of block 210 (rotating in alignment with the movement of the brake lever) will also rotate with respect to the base plate 205 (coupled to the handlebar or the like). This results in the magnetic field of the magnet(s) 235 moving relative to the sensor 225 (e.g., in one embodiment a hall-effect sensor), and thus the voltage output of the sensor 225 changes. This voltage change is used to determine the angle of the brake lever as an input into the interactive software being used to render the virtual environment.

For example, in one embodiment, input from the brake sensor could be used to provide accurate and timely braking inputs into the virtual environment. In so doing, the braking performance in the virtual environment would be enhanced to provide braking results/performance in the virtual environment that is similar to the brake input by the user on the bicycle in the real world. For example, a large move of the brake lever would result in heavy braking, a smaller movement of the brake lever would result in lighter braking, etc.

In one embodiment, similar to the steering input discussed, use of the disclosed system for measuring the angular movements of the brake lever would be able to be more accurately translate real-world input into the virtual environment thereby providing a better rendering of the performance of the bicycle within the virtual environment. Moreover, such refined timely, accurate brake input would be important in training scenarios, practice, and helping the user to find the limits of braking in corners, at different speeds, etc. (as discussed herein in the steering examples), where the actual brake input allows the virtual bicycle to perform as the real bicycle would, e.g., slowing, loss of traction, loss of directional stability, purposeful sliding, trail-braking, etc.

In one embodiment, as the bicycle pedal assembly is rotated by the user, the rotating element of block 210 (rotating in alignment with the movement of the pedal arms) will also rotate with respect to the base plate 205 (coupled to the frame or the like). This results in the magnetic field of the magnet(s) 235 moving relative to the sensor 225 (e.g., in one embodiment a hall-effect sensor), and thus the voltage output of the sensor 225 changes. This voltage change is used to determine the angle of the pedals as an input into the interactive software being used to render the virtual environment.

For example, in one embodiment, input from the pedal angle sensor could be used to provide accurate and timely pedal location input into the virtual environment. In so doing, the pedal location could be used in the virtual environment to enhance bicycle stability, results, performance in the virtual environment that is similar to the pedal input by the user on the bicycle in the real world. For example, during a downhill portion, a bicycle user may have the pedals positioned in a certain orientation to provide additional directional input via weight transference, to stop pedal drag in a turn, etc.

In one embodiment, stress and/or strain on the crank arms would change depending upon the force being applied to the pedals. The strain and/or stress could be used to determine if the user is standing on the pedals, sitting on the saddle with their feet on the pedals, used in conjunction with a resistance setting to determine if the resistance is increased (e.g., to simulate a hill climb, soft terrain (e.g., gravel, dirt, sand, water crossing, etc.), used in conjunction with a weight sensor coupled with the seatpost or saddle, a sensor to determine if a dropper seatpost has been moved down, up, etc. In one embodiment, any (or each) of these different measurements could be used as an input into the interactive software being used to render the virtual environment. In one embodiment, two or more of these different measurements could be used to provide confirming input into the interactive software being used to render the virtual environment. For example, additional stress/strain on the crank arms in conjunction with a reduced weight on the saddle (and/or input that the dropper seatpost has been activated) would indicate the user has moved to a standing-on-the-pedals position.

In one embodiment, a plurality of different timely, accurate measuring systems could be used in a single application. For example, the bicycle may be fitted with a sensor at one, some, or each of a handlebar, a front brake, a rear brake, a gear shift, etc.

In one embodiment, the sensor measurements provide a timely, accurate movement information which is used to control other inputs, electronic devices, or the like such as one or more of those discussed herein.

In one embodiment, the sensor is an optical sensors that provides the timely, accurate angle measurement. In one embodiment, the sensor is a potentiometer. In one embodiment, the sensor is a measurement type sensor such as an infrared based time of flight sensor, a radar, 2D and 3D imager, ultrasonic sensor, photoelectric sensor, LiDar, and the like. In one embodiment, the measurement type sensor is a STMicroelectronics sensor and specifically STMicroelectronics sensor model VL53LOX.

Although a number of sensors as described, in one embodiment, one or more sensors, suspension components, suspension component controller(s), data processing system(s), and the like may be used in accordance with one or more embodiments. Additional details and descriptions of sensors, suspension components, suspension component controller(s), data processing system(s), and the like are disclosed in U.S. Pat. Nos. 7,484,603; 8,838,335; 8,955,653; 9,303,712; 10,036,443; 10,060,499; 10,443,671; and 10,737,546; the contents of which are incorporated by reference herein, in their entirety.

For example, in one embodiment of an optical sensor system, the optical sensor would be placed in a fixed location (such as the base plate 205) and an optical marking (or set of markings, or the like) would be placed on block 210 and/or directly on the component being measured (e.g., the handlebars, brake lever, pedal arms, etc.), such that the markings move in synch with the component being moved and relative to the fixed location of the optical sensor. In one embodiment, the optical sensor may be mounted with the moving component, and the optical markings may be located in a fixed location relative to the movement of the component, such that the optical sensor moves in synch with the component being moved and relative to the fixed location of the optical marking.

In one embodiment, the range of motion (and/or accuracy) of the optical sensor could be adjusted based on its distance from the steering pivot (or rotation axis). In other words, the radial distance e.g., r1, r2, etc. of the sensor components from the pivot axis 215 would change the angular sweep for the sensor. For example, at the closer (or first) radial distance r1, the angular range of motion would be larger, but the level of accuracy would be less. In contrast, at a further (or second) radial distance r2 from the pivot axis 215, the angular range of motion would be smaller, but the level of accuracy would be greater, e.g., a smaller total movement radius covered, but much more precision for more accurate angular change measurements.

In one embodiment, the sensor transmits wired or wirelessly. In one embodiment, wireless transmission by the sensor communication utilizes a network such as WPAN, an LPN, IoT connectivity, or the like. In one embodiment, the wireless transmission protocol could be, but is not limited to, Bluetooth, WiFi, BLE, NFC, UHF radio signal, WiMax, ISM band, an IEEE 802.15.4 standard communicator, Zigbee, ANT, ISA100.11a, wireless HART protocol, MiWi, IPv6, 6LoWPAN, thread network protocol, SNAP, and the like.

In one embodiment, the manipulation and/or movement of the component being measured is used to generate an output to adjust the resistance of the bicycle (e.g., harder or softer resistance) to emulate an uphill or downhill section, increase or decrease a setting in the ride profile (virtual environment, etc.). In the following, the handlebar movement is used as the input being measured. However, embodiments are well suited for other component's movement being used as the input being measured (e.g., the brake lever, pedal location, gear shifter, etc.) The use of handlebar manipulation in the following examples is provided merely for purposes of clarity.

In one embodiment, the manipulation and/or movement of the handlebars is used to define a degree of the adjustment output. In other words, in one embodiment, a slight turn of the handlebar could cause a small increase or decrease in resistance while a larger turn of the handlebars could result in a larger increase or decrease in the resistance.

For example, in one embodiment, a slight turn of the handlebar to the right would cause a small increase in resistance while a larger turn of the handlebars to the right would result in a larger increase in the resistance. In contrast, in one embodiment, a slight turn of the handlebar to the left would cause a small decrease in resistance while a larger turn of the handlebars to the left would result in a larger decrease in the resistance.

In one embodiment, the measurement of the degree of the handlebar turn would provide a nearly infinite variation of the size of the increase or decrease in the resistance. In one embodiment, a turning of the handlebars to the maximum could translate into a complete removal of resistance, or the like.

In one embodiment, the manipulation and/or movement of the handlebars is used to generate an output that controls another aspect of the ride in the virtual environment. For example, manipulation and/or movement of the handlebars is used to generate an output that changes the virtual ride environment (e.g., to a different ride, a different section of the ride, etc.), the introduction/increase/decrease/removal of haptic feedback (such as a bumpy or rutty road emulation, speed bump emulation, etc.), the change in resistance, the changing of any other virtual environment setting, etc.

In one embodiment, the manipulation and/or movement of the handlebars is used to generate an output that controls a device that is not necessarily related to the workout bicycle or the virtual environment. For example, the manipulation and/or movement of the handlebars is used to generate an output that controls one or more electronic devices such as a radio, television, smart device, computer system (e.g., a desktop, laptop, pad, mobile phone, etc.), and the like. It should be appreciated that the control outputs could be assigned to different tasks depending upon user, manufacturer, etc. For example, in one embodiment, the control output could be used to control television functions such as power, channel changing, show selection, volume changing, etc.

For example, in one embodiment the control output could be used to control stereo functions such as power, station changing, song skipping, volume changing, source changing, speaker selection, etc.

In one embodiment, the control output could be used to control a smart device and its functionality such as turning on/off/adjusting a smart light, turning on/off/adjusting a thermostat, turning on/off/adjusting any smart device, etc.

In one embodiment, the control output could be used to remotely control computing device functions and functionality such as power, app selection, within app object manipulation (e.g., selecting different videos/songs, navigating within a webpage/website/or different websites, etc.), volume changing, answering/making a phone call, speaker selection, activating/pausing/stopping voice recording, sending/receiving/accessing messages (e.g., text, e-mail, SMS, MIMS, etc.), or another function or functionality of the computing device.

In one embodiment, the control output could be used to remotely control a plurality of the different devices and functions as described herein.

In one embodiment, the interaction with the computer system could be the scrolling/selecting/or navigating through a website. For example, the user could be watching a video website with a number of different content videos. The user could provide some type of handlebar input, e.g., a turn to the left to navigate backward to a previous video, a turn to the right to navigate to the next video, etc.

In one embodiment, the handlebar input could be used to provide an action based on the length of time the handlebar was turned. For example, a turn that lasted less than a second (or a predefined time frame, e.g., 3 seconds, etc.) would perform a first action, e.g., rewind a video 10 seconds; while a turn that lasted more than a second (or a predefined time frame, e.g., 3 seconds, etc.) would perform a second action, e.g., a continued rewind of the video as long as the handlebars remained turned.

In one embodiment, the navigation could be sensitive such that a small turn to the left (e.g., less than 10 degrees) would rewind a video, while a larger turn to the left (e.g., greater than 10 degrees) would select a previous video. Similarly, the navigation could be sensitive such that a small turn to the right (e.g., less than 10 degrees) would fast forward or skip ahead in a video, while a larger turn to the right (e.g., greater than 10 degrees) would select a next video.

Although two different angles are described as providing different control outputs, in one embodiment, the handlebars could provide any number of different control outputs based on the number of different angle values defined. For example, a first control output for 0-5 degrees, a second control output for 5-10 degrees, etc., until an nth control input for when the handlebars are turned the full stop distance to the side. Moreover, the number of control outputs could be based on user defined parameters, the steering control manufacturer, etc. In one embodiment, the number (and/or size of the angle) of control outputs could be initially defined by the steering controller manufacturer and then modified by the user to provide a personalized customization.

In one embodiment, the handlebar input could be used to provide an action based on the number of times the handlebar was turned. For example, a turn to the left that occurs once over a given timeframe would rewind a video 10 seconds; a turn to the left that occurs two or more times over a given timeframe would begin a continued rewind of the video. In one embodiment, the rewind would continue until a turn in the opposite direction (e.g., to the right) was provided. This would cause the control output to issue a stop to the rewinding process.

In one embodiment, a turn to the right that occurs once over a given timeframe would fast-forward (or skip) a song ahead by 10 seconds; a turn to the right that occurs two or more times over a given timeframe would begin a continued fast-forward of the song. In one embodiment, the fast-forwarding would continue until a turn in the opposite direction (e.g., to the left) was provided. This would cause the control output to issue a stop to the fast-forwarding process.

In one embodiment, the timeframe is a floating clock. For example, if a first turn of the handlebars is identified a 0.5 second (or any other user defined, manufacture defined, or adjustably defined) clock is started. Any handlebar turn that occurs within the 0.5 second time period will add to the count and restart the 0.5 second clock. When no other turning of the handlebar events occurs during the timeframe, the clock is expired and the total number of turns is identified as the command input. For example, the handlebars are turned to the right, the clock starts; within the running clock period, they are turned a second time, the clock restarts and the counter increases to two. This process will continue until no additional inputs are identified and the clock is tolled. At that time, the counter is identified, e.g., 2 and the output is provided from the controller based on the predefined 2 turns within a given time period.

In one embodiment, the handlebar input could be used to provide an action based a number of different inputs such as, but not limited to, the turning of the handlebars, the direction the handlebars are turned, the angle the handlebar is turned, the length of time the handlebar remained turned, the number of times the handlebar was turned within a given timeframe, etc.

In one embodiment, the handlebar input could be used to provide an action based on the length of time the handlebar was turned and the direction it was turned. For example, a turn to the left that lasted less than a second (or a predefined time frame, e.g., 3 seconds, etc.) would rewind a video 10 seconds; a turn to the left that lasted more than a second (or a predefined time frame, e.g., 3 seconds, etc.) would begin a continued rewind of the video as long as the handlebars remained turned. In contrast, a turn to the right that lasted less than a second (or a predefined time frame, e.g., 3 seconds, etc.) would skip to the next video; a turn to the right that lasted more than a second (or a predefined time frame, e.g., 3 seconds, etc.) would begin a continued fast-forwarding of the video as long as the handlebars remained turned.

In one embodiment, the handlebar input could be used to provide an action based on the length of time the handlebar was turned, the direction it was turned, and the angle of the turned direction. For example, a small turn to the right (e.g., less than 10 degrees) that lasted less than a second (or a predefined time frame, e.g., 3 seconds, etc.) would skip the video ahead 10 seconds; a small turn to the right (e.g., less than 10 degrees) that lasted more than a second (or a predefined time frame, e.g., 3 seconds, etc.) would begin a continued fast-forward of the video as long as the handlebars remained turned. In contrast, a larger turn to the right (e.g., greater than 10 degrees) that lasted less than a second (or a predefined time frame, e.g., 3 seconds, etc.) would skip to the next video; a large turn to the right that lasted more than a second (or a predefined time frame, e.g., 3 seconds, etc.) would begin a continued skipping forward through next videos as long as the handlebars remained turned.

In one embodiment, the handlebar input could be used to provide an action based on the number of times the handlebar was turned and the direction it was turned. For example, a turn to the left that occurs once over a given timeframe would rewind a video 10 seconds; a turn to the left that occurs two or more times over a given timeframe would begin a continued rewind of the video. In one embodiment, the rewind would continue until a turn in the opposite direction (e.g., to the right) was provided. This would cause the control output to issue a stop to the rewinding process.

In one embodiment, the handlebar input could be used to provide an action based on the number of times the handlebar was turned, the direction it was turned, the angle of the turning, etc. For example, a small turn to the right (e.g., less than 10 degrees) that occurs once over a given timeframe would fast-forward (or skip) a song ahead by 10 seconds; a small turn to the right (e.g., less than 10 degrees) that occurs two or more times over a given timeframe would begin a continued fast-forward of the song. In one embodiment, the fast-forwarding would continue until a small turn in the opposite direction (e.g., less than 10 degrees to the left) was provided. This would cause the control output to issue a stop to the fast-forwarding process.

Figure 5A:
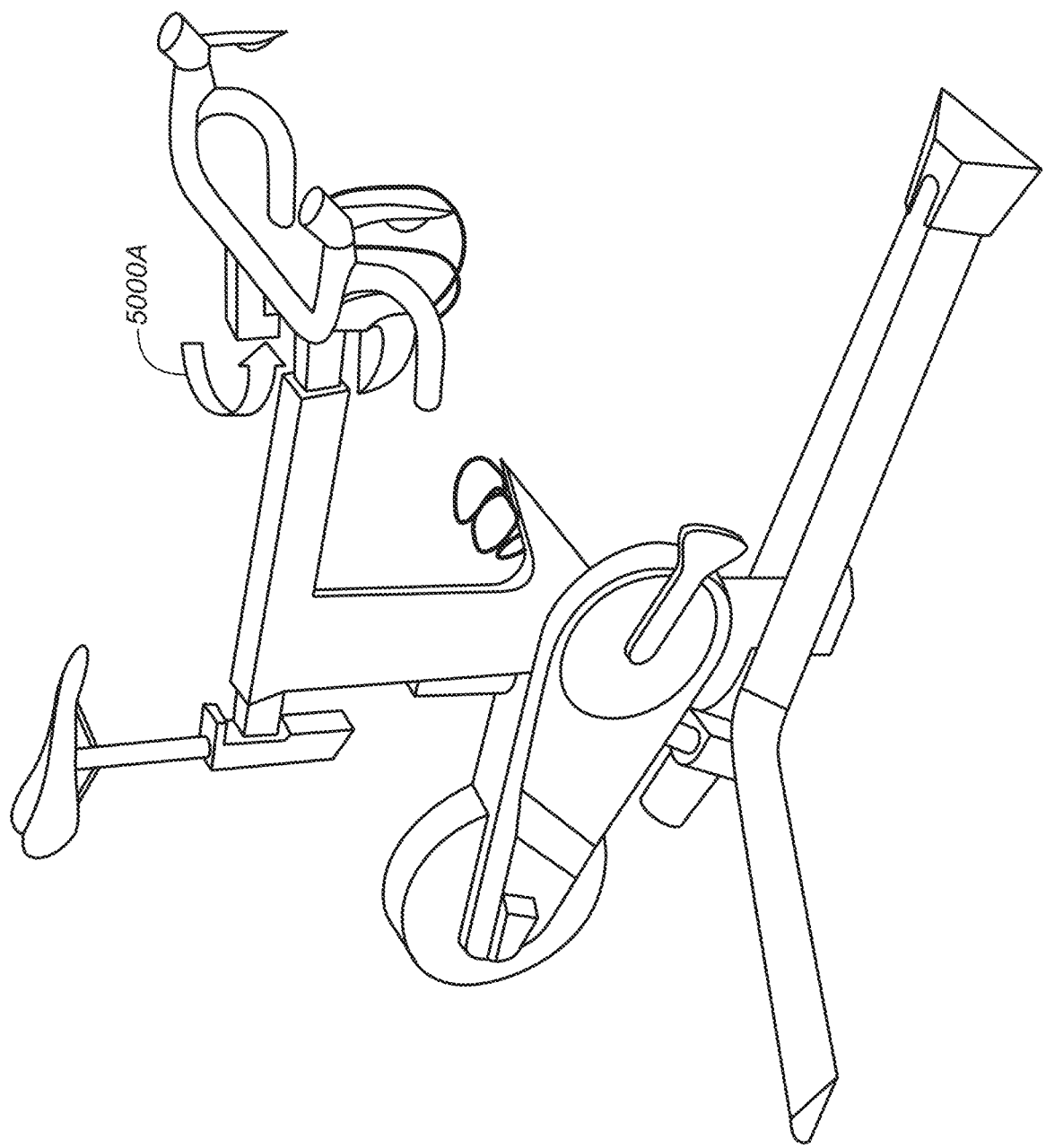
FIGS. 5A, 5B and 5C are perspective views of various bicycle trainers, in accordance with embodiments of the present invention.

Various embodiments, as described in detail above, are depicted for further illustration in FIGS. 5A, 5B, 5C, 6A, 6B, 7A and 7B. Referring to FIG. 5A, at 5000A, the pivot axis (as described above in detail) is located at the steerer axis.

Figure 5B:
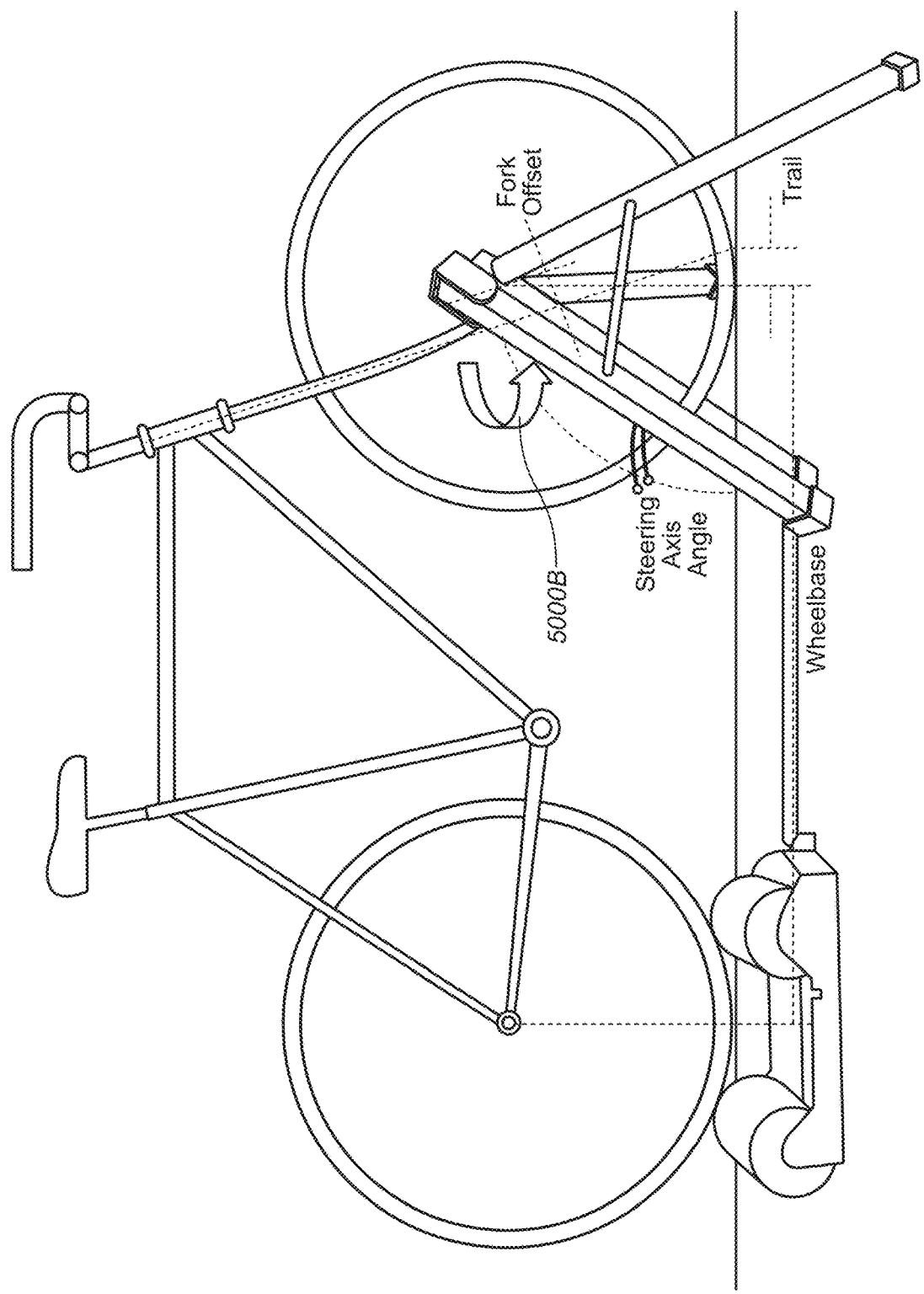
Figure 5C:
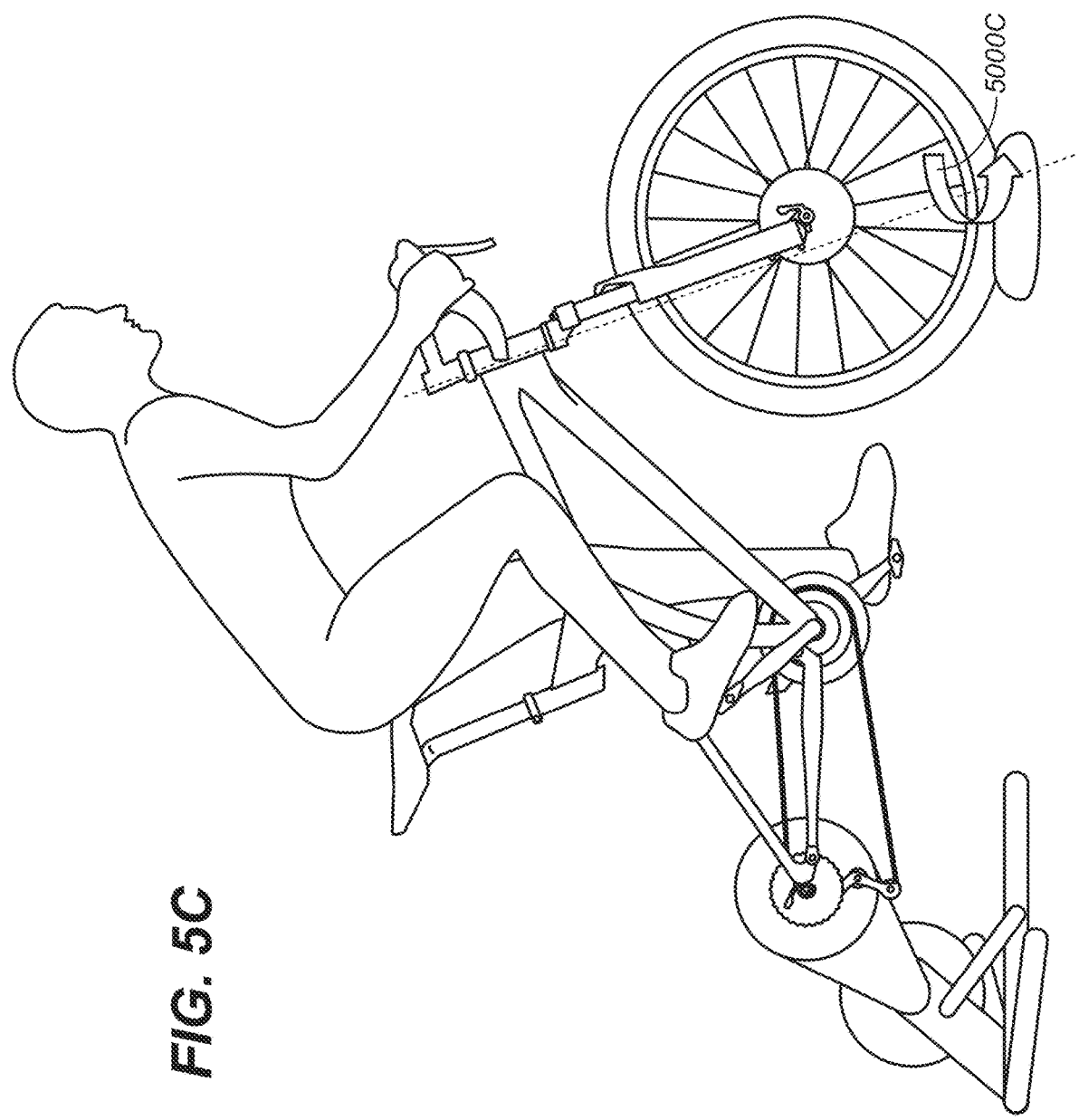
Figure 6B:
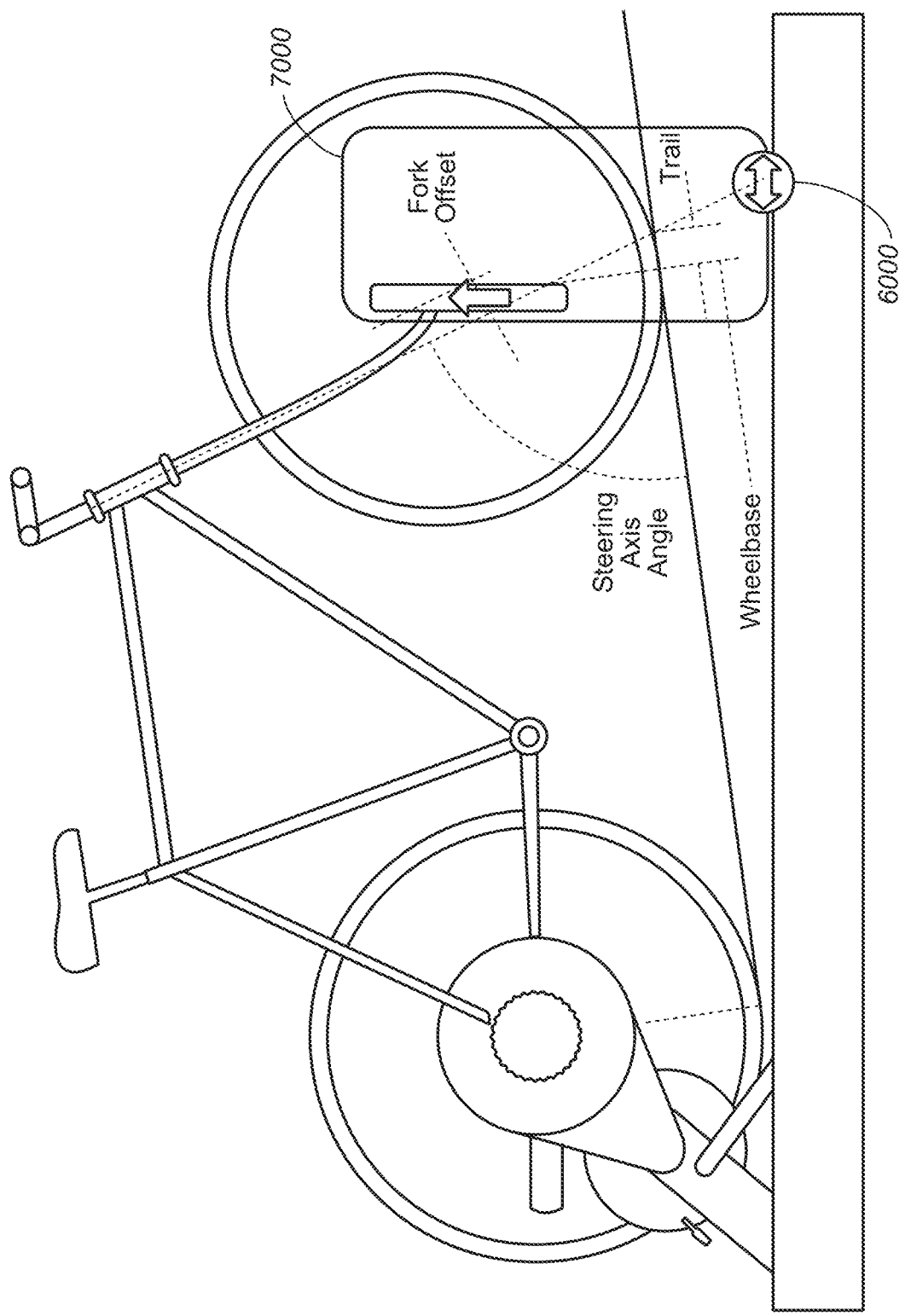

FIG. 5B provides an illustration of another embodiment of a bicycle trainer, corresponding to the numerous embodiments described in detail above. In FIG. 5B, the pivot axis is shown at 5000B and is on the steerer axis. FIG. 5C provides an illustration of another embodiment of a bicycle trainer in accordance with the present invention. In FIG. 5C, the pivot axis (as described above in detail) is shown at 5000C and is located on the steerer axis.

Figure 7A:
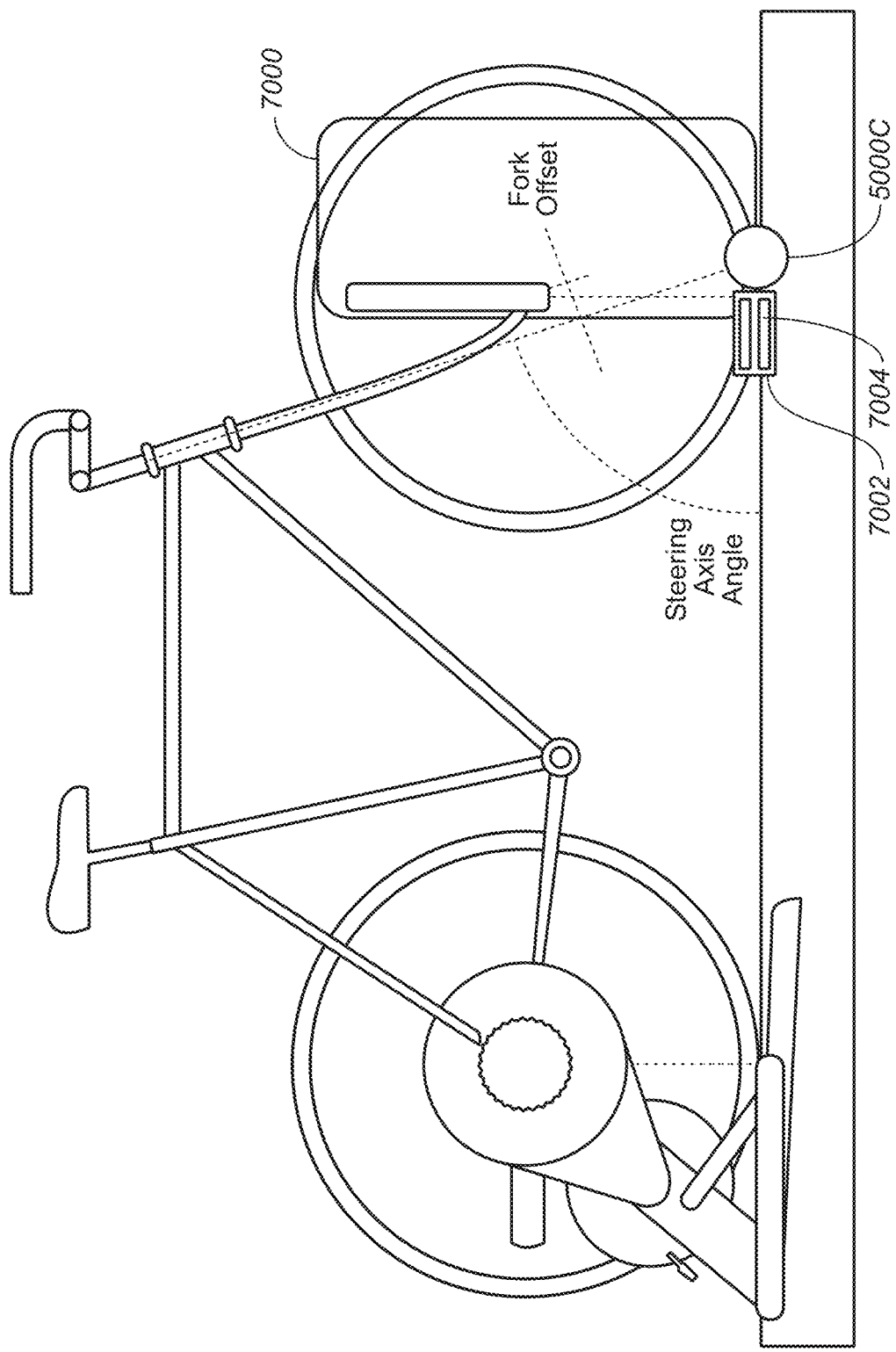
FIGS. 7A and 7B are perspective views of various bicycle trainers, in accordance with embodiments of the present invention.
Figure 7B:
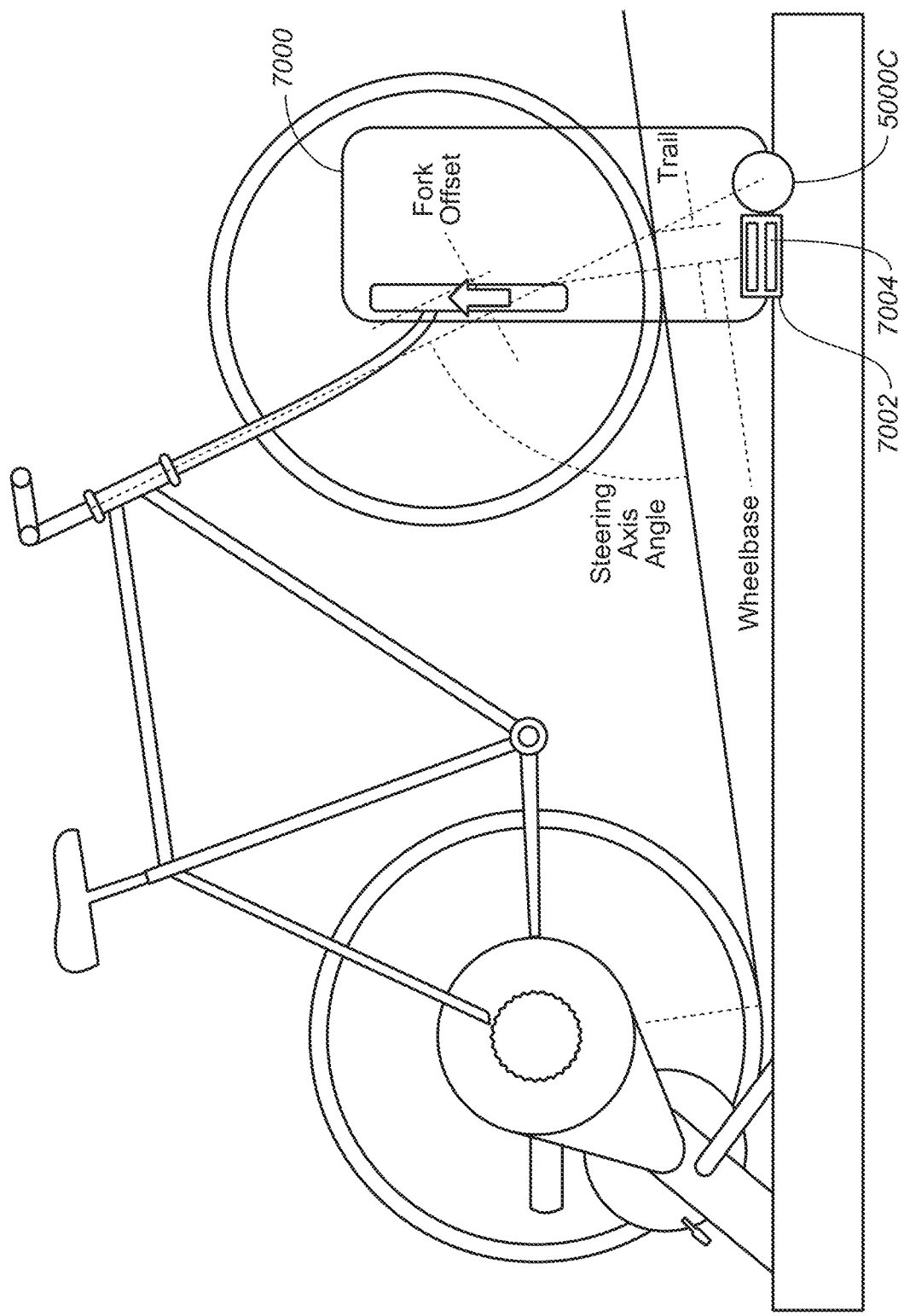

Referring now to FIGS. 6A, 6B, 7A and 7B, embodiments of the present invention are shown in which the bicycle trainer includes a spherical joint 6000A and a variable climbing block 7000 in accordance with various embodiments of the present invention. FIG. 7A depicts the bicycle trainer utilizing variable climbing block 7000 in a level position. FIG. 7A further illustrates that when the bicycle trainer is in a level position, magnets 7002 and sensor base 7004 are disposed in a first position. FIG. 7B depicts bicycle trainer utilizing variable climbing block 7000 in a "climbing" or elevated position. Furthermore, FIG. 7B illustrates that when the bicycle trainer utilizes variable climbing block 7000 in a "climbing" or elevated position, magnets 7002 and sensor base 7004 are disposed in a second position. In various embodiments of the present invention, magnets 7002 and sensor base 7004 move forward (from the first position to the second position) to ensure that magnets 7002 and sensor base 7004 remain properly positioned with respect to steerer axis 5000C.

Figure 4:
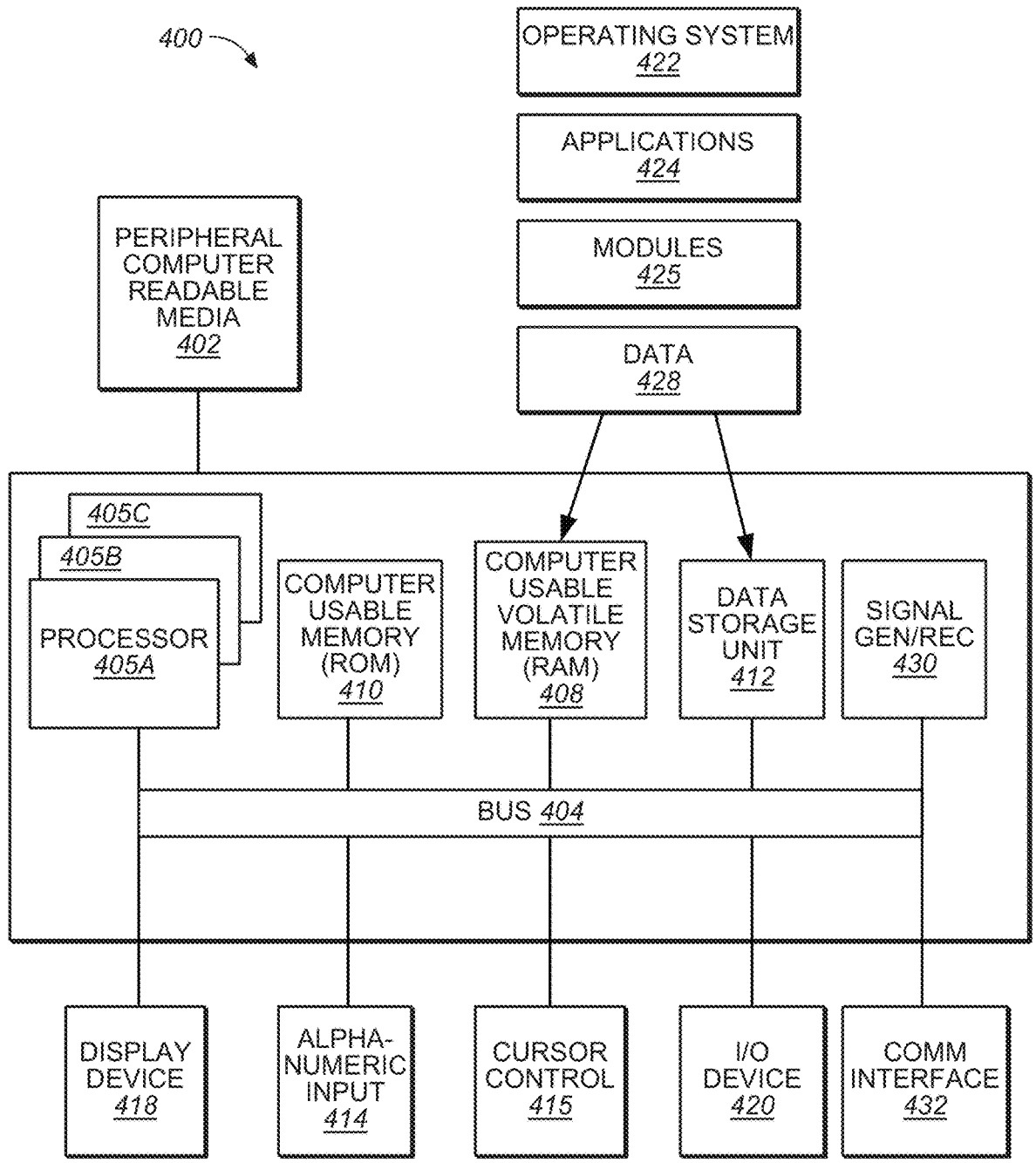
FIG. 4 is a block diagram of a computer system, in accordance with an embodiment.

Referring now to FIG. 4, an example computer system 400 is shown. In the following discussion, computer system 400 is representative of a system or components that may be used with aspects of the present technology. In one embodiment, different computing environments will only use some of the components shown in computer system 400.

Example Computer System

In one embodiment, computer system 400 includes an address/data/control bus 404 for communicating information, and a processor 405A coupled to bus 404 for processing information and instructions. As depicted in FIG. 4, computer system 400 is also well suited to a multi-processor environment in which a plurality of processors 405A, 405B, and 405C are present. Conversely, computer system 400 is also well suited to having a single processor such as, for example, processor 405A. Processors 405A, 405B, and 405C may be any of various types of microprocessors. Computer system 400 also includes data storage features such as a computer usable volatile memory 408, e.g., random access memory (RAM), coupled to bus 404 for storing information and instructions for processors 405A, 405B, and 405C.

Computer system 400 also includes computer usable non-volatile memory 410, e.g., read only memory (ROM), coupled to bus 404 for storing static information and instructions for processors 405A, 405B, and 405C. Also present in computer system 400 is a data storage unit 412 (e.g., a magnetic disk drive, optical disk drive, solid state drive (SSD), and the like) coupled to bus 404 for storing information and instructions.

Computer system 400 also can optionally include an alpha-numeric input device 414 including alphanumeric and function keys coupled to bus 404 for communicating information and command selections to processor 405A or processors 405A, 405B, and 405C. Computer system 400 also can optionally include a cursor control device 415 coupled to bus 404 for communicating user input information and command selections to processor 405A or processors 405A, 405B, and 405C. Cursor control device may be a touch sensor, gesture recognition device, and the like. Computer system 400 of the present embodiment can optionally include a display device 418 coupled to bus 404 for displaying information.

Referring still to FIG. 4, display device 418 of FIG. 4 may be a liquid crystal device, cathode ray tube, OLED, plasma display device or other display device suitable for creating graphic images and alpha-numeric characters recognizable to a user. Cursor control device 415 allows the computer user to dynamically signal the movement of a visible symbol (cursor) on a display screen of display device 418. Many implementations of cursor control device 415 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 is also well suited to having a cursor directed by other means such as, for example, voice commands. Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet or intranet. A more detailed discussion of the present technology is found below.

Referring still to FIG. 4, various other components are depicted for computer system 400. Specifically, when present, an operating system 422, applications 424, modules 425, and data 428 are shown as typically residing in one or some combination of computer usable volatile memory 408, e.g. random-access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the Internet. The present technology may be applied to one or more elements of described computer system 400.

Computer system 400 also includes one or more signal generating and receiving device(s) 430 coupled with bus 404 for enabling computer system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one (or more) communication interface 432 for coupling information to and/or from computer system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple computer system 400 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A timely component movement measuring system for a vehicle comprising:
   a component of the vehicle, said component having a range of motion;
   a sensor system to measure a movement of said component through all of said range of motion of said component, said sensor system comprising:
   a magnet coupled with said component; and
   a Hall effect sensor, wherein said magnet is positioned such that a magnetic field provided by said magnet fully inverts form north to south through said all of said range of motion of said component; and
   a virtual environment to receive said measure of said movement of said component from said sensor system, said virtual environment including an environment simulator, wherein said environment simulator alters said virtual environment corresponding to said measure of said movement of said component.

2. The timely component movement measuring system of claim 1, further comprising:
   a user interface to display said virtual environment, wherein said measure of said movement from said sensor system received by said virtual environment causes a timely change to said virtual environment.

3. The timely component movement measuring system of claim 2, wherein said timely change is said movement of said component as represented in said virtual environment.

4. The timely component movement measuring system of claim 3, wherein said timely change of said movement of said component as represented in said virtual environment causes a performance change to said vehicle as represented in said virtual environment.

5. The timely component movement measuring system of claim 2, wherein said timely change is a setting change for said virtual environment.

6. The timely component movement measuring system of claim 1, wherein said component is a handlebar.

7. The timely component movement measuring system of claim 1, wherein said component is selected from a group consisting of a brake lever, a gear shift lever, a pedal, a seatpost, a saddle, a wheel, a stem, a grip, a fork, a rear shock, a tire and a crank.

8. A timely component movement measuring system for a vehicle comprising:
   the vehicle comprising at least one component having a range of motion;
   a sensor system to measure an angular movement of said at least one component through all of said range of motion of said component, said sensor system comprising:
   a magnet coupled with said component; and
   a Hall effect sensor, wherein said magnet is positioned such that a magnetic field provided by said magnet fully inverts form north to south through said all of said range of motion of said component;
   a computing system to receive said measure of said angular movement of said at least one component from said sensor system; and
   a virtual environment operating on said computing system, wherein said measure of said angular movement from said sensor system received by said computing system causes a timely change to said virtual environment, said virtual environment including an environment simulator, wherein said environment simulator alters said virtual environment corresponding to said measure of angular movement from said sensor system.

9. The timely component movement measuring system of claim 8, further comprising:
   a user interface to display said virtual environment.

10. The timely component movement measuring system of claim 8, wherein said timely change is a setting change.

11. The timely component movement measuring system of claim 8, wherein said at least one component is a handlebar.

12. The timely component movement measuring system of claim 8, wherein said at least one component is selected from a group consisting of a brake lever, a gear shift lever, a pedal, a seatpost, a saddle, a wheel, a stem, a grip, a fork, a rear shock, a tire and a crank.

13. A timely component movement measuring system for a vehicle comprising:
   a component of the vehicle, said component having a range of motion;
   an element coupled with said component, said element to move in synch with said component, said element comprising at least one magnet;
   a sensor system to measure an angle of change of said component using a fully inverted magnetic field through all of said range of motion of said component, said sensor system comprising:
   a magnet coupled with said component; and
   a Hall effect sensor, wherein said magnet is positioned such that a magnetic field provided by said magnet provides said fully inverted magnetic field through said all of said range of motion of said component;
   a computing system to receive said measure of said angle of change of said component from said sensor system; and
   a virtual environment operating on said computing system, wherein said measure of said angle of change from said sensor system received by said computing system causes a timely change to said virtual environment, said virtual environment including an environment simulator, wherein said environment simulator alters said virtual environment corresponding to said measure of angle of change from said sensor system.

14. The timely component movement measuring system of claim 13, further comprising:
a user interface to display said virtual environment.

15. The timely component movement measuring system of claim 13, wherein said timely change is a setting change.

16. The timely component movement measuring system of claim 13, wherein said component is selected from a group consisting of: a handlebar, a brake lever, a gear shift lever, a pedal, a seatpost, a saddle, a wheel, a stem, a grip, a fork, a rear shock, a tire and a crank.

17. A bicycle trainer, said bicycle trainer comprising:
a timely component movement measuring system configured for said bicycle, said timely component movement measuring system comprising:
a measuring component configured to measure a range of movement of a component of said bicycle, said component of said bicycle having a range of motion; and
a sensor system to measure a movement of said component of said bicycle through all of said range of motion of said component of said bicycle, said sensor system comprising:
a magnet coupled with said component of said bicycle; and
a Hall effect sensor, wherein said magnet is positioned such that a magnetic field provided by said magnet fully inverts form north to south through said all of said range of motion of said component of said bicycle; and
a virtual environment to receive, from said sensor system, said measure of said component of said bicycle through said all of said range of motion of said component of said bicycle, said virtual environment including an environment simulator, wherein said environment simulator alters said virtual environment corresponding to said measure of said component of said bicycle through said all of said range of motion of said component of said bicycle.

* * * * *